United States Patent [19]

Ohmura et al.

[11] Patent Number: 4,645,258
[45] Date of Patent: Feb. 24, 1987

[54] UNDERFRAME CONSTRUCTION FOR RAILWAY VEHICLE

[75] Inventors: Keiji Ohmura; Sueo Kawai; Yoshimasa Murakami; Michifumi Takeichi; Masato Okazaki, all of Kudamatsu, Japan

[73] Assignee: Hitachi, Ltd., Tokyo, Japan

[21] Appl. No.: 782,902

[22] Filed: Oct. 2, 1985

[30] Foreign Application Priority Data

Oct. 3, 1984 [JP] Japan .................................. 59-206205
Mar. 11, 1985 [JP] Japan .................................. 60-46509
Mar. 29, 1985 [JP] Japan .................................. 60-63553

[51] Int. Cl.⁴ .............................................. B62D 33/02
[52] U.S. Cl. .................................. 296/204; 105/422
[58] Field of Search ............... 296/204, 182; 105/422

[56] References Cited

U.S. PATENT DOCUMENTS

| | | | |
|---|---|---|---|
| 3,088,420 | 5/1963 | Faverty | 296/204 |
| 3,481,643 | 12/1969 | Campbell | 296/204 |
| 3,856,344 | 12/1974 | Loeber | 296/204 |
| 4,534,589 | 8/1985 | Booher | 296/204 |

*Primary Examiner*—Robert R. Song
*Attorney, Agent, or Firm*—Antonelli, Terry & Wands

[57] ABSTRACT

An underframe construction for rolling stock vehicles comprising side sills disposed in parallel in the longitudinal direction of the underframe at the opposite outermost locations thereof, end sills connecting the side sills at the both ends in the longitudinal direction of the side sills, body bolsters arranged at positions at which a vertical load applied on the underframe is supported, center sills connecting each one of the end sills and each one of the body bolsters adjoining to one of the end sills, and a plurality of support members, each said support member being composed of upper horizontal flange, bottom plate and vertical web. The support members are disposed sequentially in the longitudinal direction of the underframe in such a fashion that the adjoining vertical webs of the support members are in contact to be bonded together and the both ends of the support members are secured to the side sills. The support members are able to support a load to be taken by the conventional cross beams and corrugated plates, thus enabling a reduction in weight and vertical dimension of the underframe.

10 Claims, 26 Drawing Figures

UNDERFRAME CONSTRUCTION FOR RAILWAY VEHICLE

BACKGROUND OF THE INVENTION

1. Field of the Invention

The present invention relates to an underframe constituting of rolling stock or a railway vehicle body, and particularly it relates to an underframe construction of a vehicle which is suitable for vehicles provided with underfloor equipment. It will be understood that when this specification refers to a "vehicle", railway rolling stock is contemplated.

2. Description of the Prior Art

An underframe in a conventional vehicle is shown, for example, in "Rolling Stock Technology No. 159" issued by Japan Association of Rolling Stock Industry, in September, 1982, at page 29. In the construction of this example, a corrugated plate is used for a floor panel, a board material for the external boards of a side framing and a roof framing, and shaped steel for the underframe and frames. A description will be made on this construction with reference to FIGS. 24 to 26. In these figures, numeral 1 denotes an underframe, 2 a side sill disposed on both sides of said underframe 1, and 3 a cross beam arranged so that it connects the end portions of said side sills 2. Numeral 4 denotes a corrugated plates provided on the top side of the aforesaid cross beams 3. Moreover, numeral 5 denotes a body bolster arranged at positions at which the vertical load on the aforesaid underframe 1 is supported, and which correspond to the location of trucks 6 an end sill provided so that it connects the ends of the side sills 2, and 7 a center sill by which a vehicle-end compression load applied on the end portions of the underframe 1 is transmitted to the aforesaid end sills 6.

In such a construction, the load of passengers and the weight of various equipment and fittings inside a vehicle act on the floor of the underframe 1 from above, while the weight of various electric apparatuses etc. acts on the floor from below, and these weights are borne mostly by the cross beams 3. Accordingly, the cross beams 3 are arranged generally at intervals of 500 mm to 700 mm in the longitudinal direction of the body of the vehicle. Moreover, each of said cross beams 3 is formed to have a ⊐-shaped cross section, as shown in FIG. 26, with an appropriate length in the vertical direction and an appropriate cross-sectional area so as to secure the rigidness and strength sufficient enough to bear said weights safely. Consequently, the weight of the cross beams 3 accounts for about 20% of the total weight of the underframe 1, which has been an impediment to weight reduction of the vehicle body. Furthermore, a space formed between the underframe 1 and rails is narrowed because of the large length in the vertical direction of said cross beams 3, and this narrows the space required for fitting the aforesaid various underfloor equipment. As a result, work is troublesome when varieties of underfloor equipment or ducts or the like are fitted in a large number to the underfloor part of the underframe 1. In addition, the overhead position of work required for fitting hinders working efficiency, while necessitating much labor. When it is necessary to provide heat insulating materials on the whole of the lower side of the underframe 1, said space is further reduced, thus causing disadvantages that it becomes difficult to secure the space required for the aforesaid underfloor equipment or the like and that there is a marked increase in labor, and the lower structure of the underframe becomes undesirably complex.

SUMMARY OF THE INVENTION

An object of the present invention is to furnish an underframe construction which is light in weight and which has a vertical dimension less than that of the prior art.

The present invention, is characterized in that it comprises side sills disposed parallel on opposite sides of an underframe, end sills connecting the opposite ends in the longitudinal direction of said side sills, body bolsters arranged at positions at which a vertical load on the underframe is supported, center sills connecting each one of the end sills and adjoining one of the body bolsters, and a series of support members, each support member being composed of an upper horizontal flange, a bottom plate and a vertical web, and said series of support members are disposed sequentially in the longitudinal direction of the underframe in such a fashion that the both ends of each of said support members are secured to the side sills and the adjoining vertical webs of said support members are bonded to each other.

DESCRIPTION OF THE PREFERRED EMBODIMENT

Figure 1:
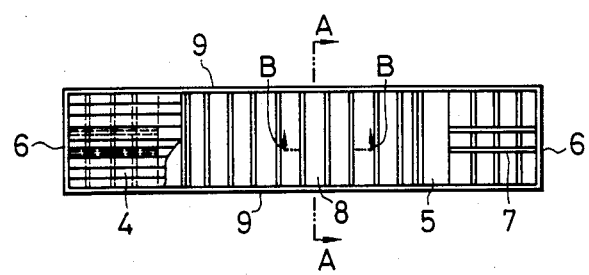
FIG. 1 is a plan view of one embodiment of an underframe construction according to the present invention.
Figure 2:
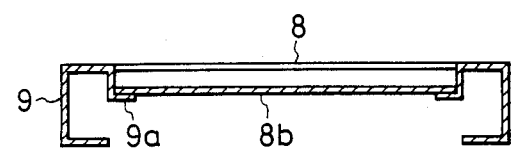
FIG. 2 shows a section taken along A—A of FIG. 1.
Figure 3:
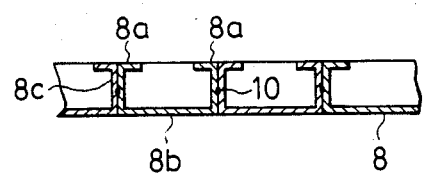
FIG. 3 shows a section taken along B—B of FIG. 1.

FIGS. 1 to 3 show one embodiment of the present invention, of which FIG. 1 shows the entire structure of the underframe and FIGS. 2 and 3 sections taken along A—A and B—B of FIG. 1 respectively. In FIGS. 1 to 3, the same marks with those of the conventional example described previously denote the same members with those of said example. Numeral 8 denotes a member of box-type construction composed of an upper-horizontal part 8a, a lower-horizontal part 8b and a vertical part 8c. Numeral 9 denotes a side sill having a flange 9a formed for supporting the end portion of said member 8 of box-type construction inside the underframe. Numeral 10 denotes a junction for jointing the vertical parts 8c of the members 8 of box-type construction to each other when these members 8 are disposed sequentially in the longitudinal direction of a vehicle body. This junction 10 is formed by spot-welding or the like.

The underframe, which is constructed of the aforesaid members, is assembled in the following way. First, the side sills 9, body bolsters 5, end sills 6, and center sills 7 disposed as occasion calls, are jointed. Then, the members 8 of box-type construction are disposed sequentially between the adjacent body bolsters 5 arranged at longitudinal positions of the vehicle body. The respective end portions of the members 8 of box-type construction are fitted in hanging on the respective flanges 9a of said side sills 9 and secured thereby. Adjacent ones of said members 8 are in contact with each other in the vertical parts 8c thereof and are jointed together by spot-welding or the like to form a junction 10. The mutual jointing of the members 8 or the jointing thereof with the side sills 9 may be conducted by riveting other than welding or by applying a bonding agent to the joint prior to welding or riveting. Moreover, in disposition of said members 8 of box-type construction between the side sills 9, a plurality of the members 8 may be joined prior to the disposition thereof between the side sills 9 and the joining thereof to them.

Since the members 8 of box-type construction form a box-shaped section, according to the above-stated structure, the section modulus thereof can be improved and the strength thereof can be increased, and thereby the thickness of a material forming said members 8 can be reduced. Consequently, the members 8 can be made light, and the entire underframe can be made lighter in weight than the conventional one. Furthermore, when the underframe is constructed by using the aforesaid members 8 of box-type construction, these members 8 are provided all over the floor. This provision of the members 8 makes it possible to narrow a part, such as a space between the cross beams in the conventional underframe, which can not support a load, and also makes it possible to lay a floor board directly without providing a corrugated plate. Thereby the size of the underframe in the vertical direction, i.e. the thickness thereof, can be reduced, and further the weight thereof can be reduced. Since the thickness of the underframe can be reduced as described above, a space required for fitting apparatuses between the lower side of the underframe and rails can be secured sufficiently. When it is necessary to provide a heat insulating material in a floor part, it is necessary only to insert the heat insulating material into the aforesaid members 8 of box-type construction, no other specific work and structure for fitting said heat insulating material being required. Moreover, with an opening provided in the upper-horizontal part 8a of the member 8, the task of inserting the heat insulating material can be performed in a flat position, and thereby the working efficiency can be improved. Although a corrugated plate 4 is provided in an area from the body bolster 5 to the end portion of the vehicle in the above-described constitution of one embodiment of the present invention, the same effect as in this embodiment can be obtained by a constitution in which the members 8 of box-type construction are arranged over to the end portion of the vehicle and fitted to the floor from below as members for intensifying the strength of the body bolster 5 and the center sills 7. In addition, while an opening is provided for insertion in the upper-horizontal part 8a of the member 8 of box-type construction in the aforesaid embodiment, the heat insulating material may be inserted from the opposite ends of the member, and when the heat insulating material is not provided, said opening does not need to be provided.

Figure 4:
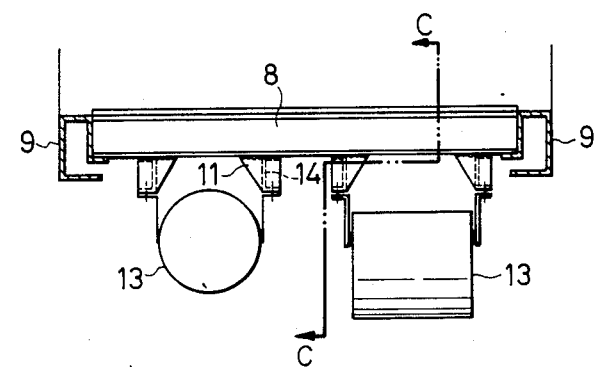
FIG. 4 is a sectional view showing the state of equipment fitted under the floor in the construction of FIG. 1.
Figure 5:
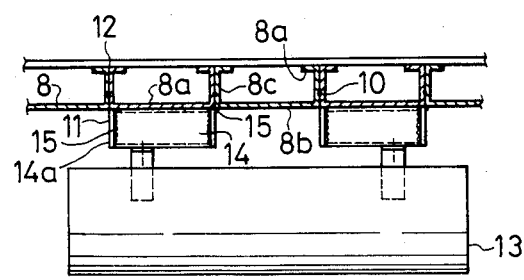
FIG. 5 is a sectional view along C—C of FIG. 4.

Next, a constitution in which various apparatuses are fitted to an underfloor part in the aforesaid embodiment will be described hereunder with reference to FIGS. 4 and 5. In these figures, the same marks with those in said embodiment denote the same members with those in this embodiment. Numeral 11 denotes a rib joint by welding or the like corresponding to the vertical part 8c of the member 8 of box-type construction. This rib 11 is provided, since the members 8 are constructed of a thin plate material and thus can not provide a throat depth sufficient enough for brackets to be welded thereto. The rib 11 is fitted by forming a weld 15 at a position regarded as appropriate for the position of installation of an underfloor equipment 13 along the junction 12 of the jointed members 8 of box-type construction. Numeral 14 denotes an apparatus fitting metal piece whose end portion 14a is in contact with said rib 11 and which is connected to the member 8 by forming the weld 15. An underfloor equipment is fitted to this apparatus-fitting metal piece 14 to be supported thereby. In the above-described constitution, the apparatus-fitting metal piece 14 is also jointed to a portion of the lower horizontal part 8b of the member 8 of box-type construction as necessary. The aforesaid rib 11 and apparatus-fitting metal piece 14 may be provided either by fitting the rib 11 to the member 8 first and then joining the metal piece 14 thereto, or by joining the rib 11 and the metal piece 14 together and then fitting them to the member 8.

In such a constitution, loads in the longitudinal and transverse directions caused by inertia generated at the starting and stopping of the vehicle and in running thereof, in addition to the vertical load of a fitted underfloor apparatus 13, act on the apparatus-fitting metal pieces 14. The constitution as described above is effective, in particular, for vertical loads. Specifically, most of the vertical load acting on the apparatus-fitting metal piece 14 is transmitted therefrom to the members 8 of box-type construction through the rib 11 and the weld 15 of the junction 12 of these members 8. Therefore the reliability in strength of the fitting portion of said metal piece 14 can be improved remarkably, while the capacity of a separate apparatus-fitting metal piece 14 can be increased. Moreover, even an underfloor apparatus 13 of relatively heavy weight can be supported without increasing the number of the metal pieces 14 provided, and thus the number of these metal pieces 14 to be provided in the entire underframe can be reduced. With respect to the provision of the metal pieces 14, they can be provided as needed without any restriction.

Figure 6:
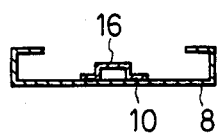
FIGS. 6 to 9 and 11 to 20 are sectional views of other embodiments of a member of box-type construction.
Figure 7:
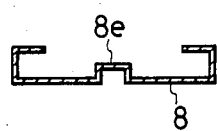
Figure 8:
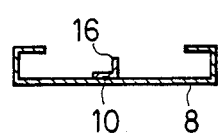
Figure 9:
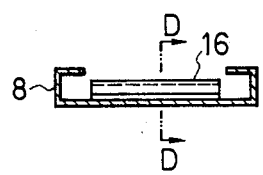
Figure 10:
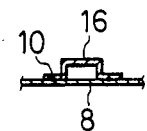
FIG. 10 shows a section taken along D—D of FIG. 9.
Figure 11:
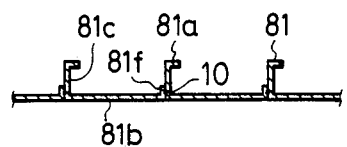

Next, a description will be made hereunder on other embodiments of the member 8 of box-type construction. FIGS. 6 to 10 show variants of said member 8 of the above-described embodiment. A member 8 of box-type construction of FIG. 6 is provided with a reinforcement material 16 which has a ⌐⌐-shaped section and is disposed and jointed in the longitudinal direction on the inside of the lower-horizontal part 8b thereof. A member 8 of box-type construction of FIG. 7 has a structure in which a groove-shaped reinforcement element 8e is formed in the lower-horizontal part 8b thereof. A member 8 shown in FIG. 8 is formed by changing the shape of the reinforcement material 16 in the structure of FIG. 6 into an "L" configuration as shown in FIG. 7. A member 8 of box-type construction of FIGS. 9 and 10 is formed by disposing the reinforcing material 16 of the structure of FIG. 6 in the direction of width thereof.

According to such constitutions, the strength of the member 8 of box-type construction can be improved markedly only by providing the reinforcing material 16 of simple structure or by forming the reinforcement element 8e. Accordingly, said member 8 itself, as well as the entire underframe, can be reduced in weight.

Figure 12:
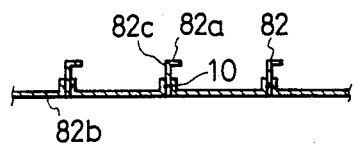

Next, other variants of the above-described member 8 of box-type construction will be described with reference to FIGS. 11 to 15. A member 81 of box-type construction shown in FIG. 11 has a structure in which one of vertical parts 81c is shortened and a vertical part 81f thus formed is not provided with a upper-horizontal part. According to such a structure, a box-shaped section is formed by the members 81 set in contact and joined. Accordingly, the shape of said section is similar, in the jointed state, to that of the previously-described embodiment, and the strength of this section is approximate to that of said embodiment. As for the vertical part 81f, the weight thereof is lighter than the other vertical part 81c because of the short size thereof, and thus the weight of the entire underframe can be reduced. A member 82 of box-type construction shown in FIG. 12 is an assembly of an element forming an upper-horizontal part 82a and a vertical part 82c and an element forming a lower-horizontal part 82b, which are prepared separately. In addition, a vertical part 82f formed by bending is provided at the end portion of the lower-horizontal part 82b in the direction of width thereof. When these parts are joined, accordingly, the vertical part 82c and the vertical part 82f are put in one together to form the junction 10, and the joining is made in this junction. According to such a constitution, work to shape the member 82 of box-type construction into an integrated and complicated form can be dispensed with. In addition, the plate thickness of a part requiring a high strength, such as the vertical part 82c or the lower-horizontal part 82b, for instance, can be varied partially to increase a strength. By increasing the strength in this way, the plate thickness of the other part, irrelevant to this increase in strength, can be reduced, and thus the increase in strength and the reduction thereof can be attained efficiently.

Figure 13:
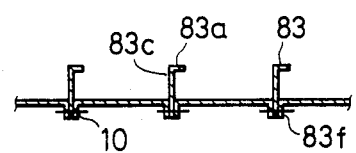
Figure 14:
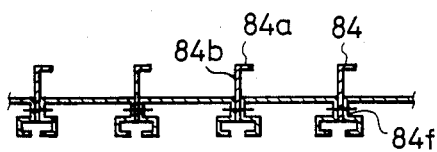
Figure 15:
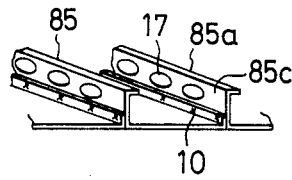

A member 83 of box-type construction shown in FIG. 13 is a variant of the structure shown in FIG. 12, and in this variant, the vertical part 83f positioned at the opposite end portions of the lower-horizontal parts 83b is extended downward. According to this constitution, the end portion of said vertical part 83f is put in a state of tensile stress when a load is applied on said member 83 of box-type construction, and thereby buckling between rivets in the vertical part 83f can be prevented. A member 84 of box-type construction shown in FIG. 14 is a variant of the structure shown in FIG. 13, and in this variant, the extension of the aforesaid vertical part 84f is formed into a support member which supports the underfloor equipment. Such a constitution makes it possible to dispense with any other support member for supporting said apparatus provided under the floor, thus enabling the reduction in the number of components of the underframe. A member 85 of box-type construction shown in FIG. 15 has a structure in which openings 17 are formed in the vertical part 85c in such a manner that the strength is maintained as much as possible. Such a structure enables the reduction in the own weight of the member 85.

Figure 16:
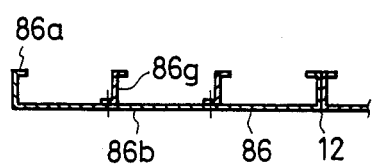
Figure 17:
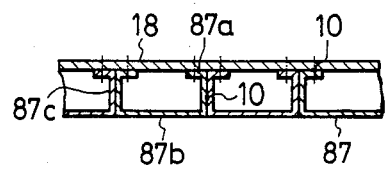
Figure 18:
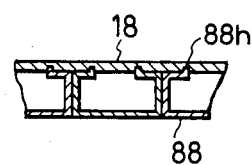
Figure 19:
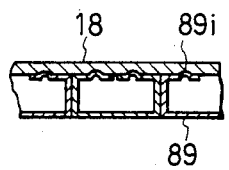
Figure 20:
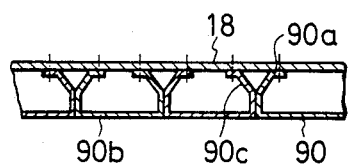

Next, still other variants of the above-stated member 8 of box-type construction will be described hereunder with reference to FIGS. 16 to 23. A member 86 of box-type construction shown in FIG. 16 is formed so as to be wide, and upper-horizontal parts 86a are formed only in the opposite ends thereof, while an intermediate part between them is opened. Moreover, vertical web 86g having a Z-shaped section are disposed parallel to vertical parts 86c inside the aforesaid intermediate part in the direction of width of said member 86. Said vertical web 86g are fitted on the inside of a lower-horizontal part 86b. In addition to the attainment of the same effect as in the previously-described embodiment, this constitution enables the reduction of places which require sealing when a vehicle body is constructed to be airtight, since the number of junctions 12 can be reduced in the whole of the underframe, thus enabling the reduction in the number of processes and the simplification of the structure. In a member 87 of box-type construction shown in FIG. 17, a floor board 18 is jointed to the upper-horizontal parts 87a thereof, and thus a firm strength member having a closed section is formed by said floor board 18 and the member 87. The member 87 and the floor board 18 can be jointed together by various means such as rivet jointing or rivet jointing with a bonding agent. When a heat insulating material is inserted into said member 87 of box-type construction, it is recommended that the task of insertion be accomplished the member 87 is joined to the floor board 18. By jointing the member 87 and the floor board 18 together firmly by the above-stated means, according to this constitution, said floor board 18 acts as the strengthening member together with the member 87, and a load is shared by the lower-horizontal part 87b of the member 87 and the floor board 18. Thus, the strength of the structure can be improved and, accordingly, the thickness of various members can be reduced, which results in the reduction of the weight thereof. Next, a member 88 of box-type construction shown in FIG. 18 has a structure in which a rib 88h is provided in the end portion of each upper-horizontal part 87a of the member 87 of box-type construction shown in FIG. 17. Since said rib 88h is fitted in the floor board 18 according to such a constitution, the joint is made firm, and thus the strength is further improved. A member 89 of box-type construction shown in FIG. 19 has a structure in which an upper-horizontal part 89a is provided with a projection 89i. In the same way as the structure of FIG. 18, the present member 89 enables the strengthening of the joint to the floor board 18, thus enabling the improvement in strength. In addition, indented portions corresponding to each other may be formed on the joints 12 of adjacent members 8 respectively so as to strengthen the junction between these members and ensure the hermetic seal thereof. In a member 90 of box-type construction shown in FIG. 20, a vertical part 90c is provided with a slanting portion so that an interval between upper-horizontal parts 90a jointed to the floor board 18 is made virtually uniform. Such a structure has an advantage that the deflection of the floor board 18 caused by a vertical load is diminished, since the upper-horizontal parts 90a are spaced almost uniformly. Consequently, the width of a lower-horizontal part 90b can be made larger than that in the structure of the previously-described embodiment, and thus the number of the members 90 of box-type construction in the whole of the underframe can be decreased.

Figure 21:
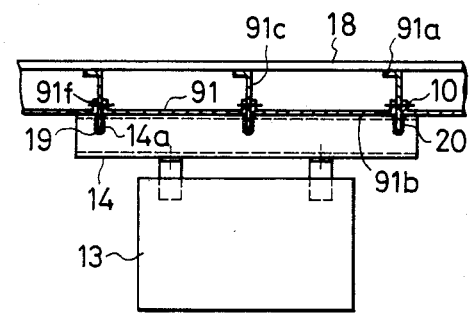
FIGS. 21 and 23 are sectional views showing the state of equipment fitted under the floor in other embodiments of the member of box-type construction.
Figure 22:
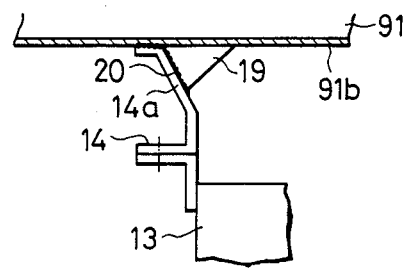
FIG. 22 is an enlarged sectional view showing the state of fitting of an apparatus-fitting metal shown in FIG. 21.

A member 91 of box-type construction shown in FIGS. 21 and 22 is a variant of the one shown in FIG. 12, and this member 91 has a structure in which a vertical part 91c is extended downward and a projecting portion 19 is formed in the end of this part. An apparatus-fitting metal piece 14 is jointed to said projecting portion 19 through the intermediary of a junction 20 formed between the web 14a of the piece 14 and the projecting portion 19. An underfloor apparatus 13 is supported by said apparatus-fitting metal piece 14. According to such a constitution, the length of the projecting portion 19 of the vertical part 91c can be set freely, and thus this portion can be jointed to the metal piece 14 in an appropriate manner. Moreover, the concentration of stress can be reduced, since the junction 20 is positioned close to the direction of the application of a vertical load. In addition, the structure can be reduced in weight and increased in strength, since the thickness of the vertical part 91c can be selected arbitrarily in accordance with a load applied thereon.

Figure 23:
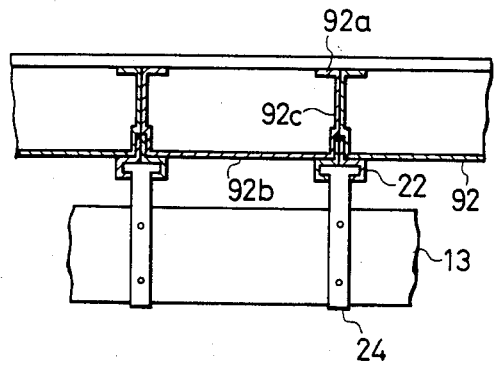
Figure 24:
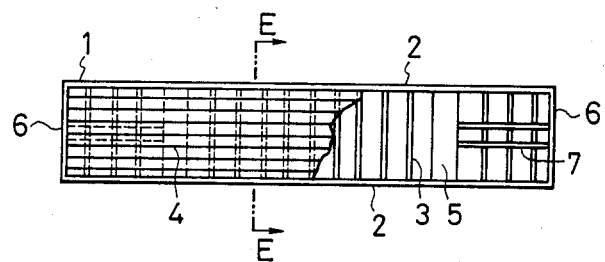
FIG. 24 is a plan view of a conventional underframe construction.
Figure 25:
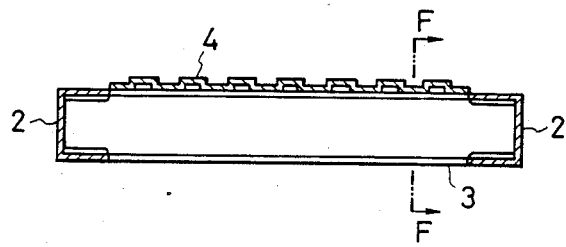
FIG. 25 shows a section taken along E—E of FIG. 24.
Figure 26:
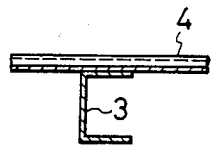
FIG. 26 shows a section taken along F—F of FIG. 25.

Next, a member 92 of box-type constitution shown in FIG. 23 has a concavity formed in the lower end portion of a vertical part 92c. This concavity has a size allowing rail 22 to be put therein, and this rail 22 is jointed to and supported by said concavity. The rail 22 is fitted with a bracket 24 for suspending the underfloor apparatus 13. Since the rail 22 is fitted in the member 92 of box-type construction according to the above-stated constitution, the underfloor apparatus 13 can be supported at a high position. In addition, the number of components can be reduced, and the weight can be reduced.

According to the present invention, ad described above, an underframe being light in weight and having a short vertical dimension can be furnished.

What is claimed is:

1. An underframe construction for rolling stock, comprising side sills disposed parallel in opposite side positions of an underframe, end sills which connect the opposite ends in the longitudinal direction of said side sills, body bolsters arranged at positions at which a vertical load applied on the underframe is supported, load support members comprising upper-horizontal, lower horizontal and vertical parts, respectively, and juxtaposed sequentially in the longitudinal direction of the underframe, end portions of the load support members in the transverse direction of the rolling stock body being jointed to the side sills, a floor board is jointed to the upper-horizontal part of the load support members, and a projection projecting upward and engaging the floor board is provided in the upper-horizontal part at the position at which the part is joined to the floor board.

2. An underframe construction for rolling stock, comprising side sills disposed parallel on opposite side positions of an underframe, end sills which connect the opposite ends in the longitudinal direction of said side sills, body bolsters arranged at positions at which a vertical load applied on the underframe is supported, load support members comprising upper-horizontal, lower-horizontal and vertical parts, respectively, and juxtaposed sequentially in the longitudinal direction of the underframe, end portions of the load support members in the transverse direction of the rolling stock body being jointed to the side sills, the vertical-and lower-horizontal parts of the load support members being formed separately and joined to each other, and the vertical part of said load support members is extended downward to form an extension which serves as a suspension for an apparatus.

3. An underframe construction for rolling stock, comprising side sills disposed parallel on opposite side positions of an underframe, end sills which connect the opposite ends in the longitudinal direction of said side sills, body bolsters arranged at positions at which a vertical load applied on the underframe is supported, load support members comprising upper-horizontal, lower horizontal and vertical parts, respectively, and juxtaposed sequentially in the longitudinal direction of the underframe, end portions of the load support members in the transverse direction of the rolling stock body being jointed to the side sills, and a concavity in which the suspension for an apparatus is fitted is formed in the vertical part of the load support members.

4. An underframe construction for rolling stock, comprising:
    side sills disposed in parallel in the longitudinal direction of said underframe at the opposite outermost locations thereof and supporting longitudinal and vertical loads to be carried on said underframe;
    end sills connecting said side sills at the both ends in the longitudinal direction of said side sills;
    body bolsters disposed at the locations corresponding to positions at said underframe to support a vertical load on said underframe thereat;
    center sills disposed between each one of said end sills and each one of said body bolsters adjoining said one of the end sills and supporting a longitudinal load; and
    support members disposed crosswise between said side sills located at the both sides of said underframe each of said support members comprising an upper horizontal flange, a bottom plate and a vertical web, and said support members disposed in the longitudinal direction of said underframe in such manner that the adjoining said support members are in contact with each other to be bonded at the part of said vertical web.

5. An underframe construction as defined in claim 4, wherein said upper horizontal flange has a portion projecting upward from the upper horizontal level so as to permit a floor panel to fit on the top of said upper horizontal flange.

6. An underframe construction as defined in claim 4, wherein underfloor equipment supporting bracket means is bonded to one or more of said support members at a location below said vertical web.

7. An underframe construction as defined in claim 4, wherein said bottom plate is separate from said vertical web, and said vertical web has a portion extending downward from a lower horizontal level so as to permit an underfloor equipment supporting bracket means to be bonded to said portion.

8. An underframe construction as defined in claim 4, wherein said vertical web has a concavity at a downward portion for underfloor equipment supporting bracket means to fit therein.

9. An underframe construction for railway vehicle comprising:
    side sills disposed in parallel in a longitudinal direction of said underframe at opposite outermost locations thereof and supporting longitudinal and vertical loads carried on said underframe;
    end sills connecting said side sills at the both ends in a longitudinal direction of said side sills;
    body bolsters disposed at locations corresponding to positions at said underframe to support a vertical load on said underframe thereat;
    center sills disposed between each one of said end sills and each one of said body bolsters adjoining said one of the end sills and supporting a longitudinal load; and support members disposed crosswise between said side sills located at the both sides of said underframe said side sills having a flanged portion to permit said support members to be supported thereon at the ends in the longitudinal direction of said support members, each of said support members comprising an upper horizontal flange, a bottom plate and a vertical web, and said support members being disposed in the longitudinal direction of said underframe in such manner that adjoining said support members are in contact with each other to be bonded at the part of said vertical web.

10. A method of manufacturing of an underframe for rolling stock, comprising the steps of disposing side sills in parallel in a longitudinal direction of said underframe at opposite outermost locations thereof so as to support longitudinal and vertical loads to be carried on said underframe, connecting said side sills at the both ends in a longitudinal direction of said side sills by end sills, disposing body bolsters at locations corresponding to positions at said underframe to support a vertical load on said underframe thereat, and joining center sills disposed between each one of said end sills and each one of said body bolsters adjoining said one of the end sills to support a longitudinal load, thereafter disposing a plurality of support members, each being composed of an upper horizontal flange, a bottom plate and a vertical web, in such a manner that the adjoining said support members are in contact with each other and are bonded at the part of said vertical web, and then joining said plurality of support members having been so bonded to said side sills sequentially in the longitudinal direction of said underframe.

* * * * *